United States Patent
Khatri et al.

(10) Patent No.: US 10,358,170 B2
(45) Date of Patent: Jul. 23, 2019

(54) TRUCK BED FOLDABLE SHELF

(71) Applicant: FORD GLOBAL TECHNOLOGIES, LLC, Dearborn, MI (US)

(72) Inventors: Azazhusen V. Khatri, Dearborn, MI (US); Joshua Robert Hemphill, White Lake, MI (US); Michael Joseph Lee, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 66 days.

(21) Appl. No.: 15/672,619

(22) Filed: Aug. 9, 2017

(65) Prior Publication Data
US 2019/0047638 A1   Feb. 14, 2019

(51) Int. Cl.
*B60R 9/00* (2006.01)
*B60R 11/00* (2006.01)
*B62D 33/02* (2006.01)

(52) U.S. Cl.
CPC ............... *B62D 33/02* (2013.01); *B60R 9/00* (2013.01); *B60R 11/00* (2013.01); *B60R 2011/004* (2013.01); *B60R 2011/0082* (2013.01)

(58) Field of Classification Search
CPC .... B60R 2011/004; B60R 11/00; B62D 33/03
USPC .......................................................... 296/37.6
See application file for complete search history.

(56) References Cited

U.S. PATENT DOCUMENTS

| | | | |
|---|---|---|---|
| 3,768,858 A * | 10/1973 | Boismier | B60J 7/041 296/10 |
| 5,011,214 A * | 4/1991 | Friesen | B60J 7/141 160/213 |
| 6,254,169 B1 * | 7/2001 | Arthur | B60J 7/1621 296/100.04 |
| 6,644,704 B1 | 11/2003 | Nyberg | |
| 6,783,169 B1 * | 8/2004 | Marx | B60J 7/041 296/100.03 |
| 7,959,200 B2 | 6/2011 | Voglmayr | |
| 9,540,050 B2 * | 1/2017 | Miller | B60J 7/141 |
| 2014/0197653 A1 | 7/2014 | Stepanians | |
| 2016/0082817 A1 * | 3/2016 | Mulholland | B60J 7/1621 296/100.1 |
| 2016/0129827 A1 * | 5/2016 | Johnston | B60P 3/39 5/118 |

* cited by examiner

*Primary Examiner* — Pinel E Romain
(74) *Attorney, Agent, or Firm* — Vichit Chea; Brooks Kushman P.C.

(57) ABSTRACT

A truck bed foldable shelf includes a platform and a support hingedly attached to the platform with a first hinge at one end and hingedly attached to a truck bed rim at an opposing end with a second hinge, spaced apart from the first hinge, such that the shelf is configured to freely hang under the lip in a stowed position and lie in a horizontal orientation in a raised position.

20 Claims, 9 Drawing Sheets

TRUCK BED FOLDABLE SHELF

TECHNICAL FIELD

The disclosure relates to automotive truck bed foldable shelf assemblies and a method of using the same.

BACKGROUND

An automotive vehicle having an open load bed such as a truck is designed to carry cargo in the bed. To further assist in organization and protection of the carried cargo and to increase a storage area to accommodate additional objects, a shelf system may be implemented in the open load bed.

SUMMARY

In at least one embodiment, a truck bed foldable shelf is disclosed. The shelf includes a platform. The shelf further includes a support. The support is hingedly attached to the platform with a first hinge at one end and hingedly attached to a truck bed rim at an opposing end with a second hinge. The second hinge is spaced apart from the first hinge such that the shelf is configured to freely hang under the rim in a stowed position and lie in a horizontal orientation in a raised position. The shelf in the raised position may lie flush with a side edge of the rim. The second hinge may be attachable to a top edge of the rim. The truck bed rim includes a headboard, tailgate, or a box side. The platform may be extendable at both of its lateral ends to extend a width of the truck bed in the raised position. The platform may have a greater length than the support. The support may have a length equal to a height of the rim.

In another embodiment, a truck bed foldable shelf is disclosed. The shelf includes a platform. The shelf further includes a support. The support is hingedly attached to the platform with a first hinge at one end and hingedly attached to a truck bed headboard lip at an opposing end with a second hinge. The second hinge is spaced apart from the first hinge such that the shelf is configured to freely hang under the lip in a stowed position and lie in a horizontal orientation in a raised position. The shelf includes a headache rack pivotably coupled to the platform at the first hinge. The rack stands in a vertical orientation. The rack may extend perpendicularly to the platform. The rack may have dimensions exceeding at least one dimension of a truck back window. The rack may include a solid material and a pattern of apertures. At least one dimension of the rack and the platform may differ. The platform may be extendable at both of its lateral ends to extend a width of the truck bed in the raised position. The shelf in the raised position may lie flush with a side edge of the lip.

In yet another embodiment, a truck bed foldable shelf is disclosed. The shelf includes a platform. The shelf further includes a support. The support is hingedly attached to the platform with a first hinge at one end and hingedly attached to a truck bed rim at an opposing end with a second hinge. The second hinge is spaced apart from the first hinge such that the shelf is configured to freely hang under the rim in a stowed position and lie in a horizontal orientation in a raised position. The shelf further includes one or more legs. The legs are hingedly attached to the platform with a third hinge spaced apart from the second hinge, the one or more legs being extendable in the raised position to support the platform. The one or more legs may be telescoping to enable raising the platform second end at various heights. The one or more legs may have a rubberized ending to decrease friction between the legs and a bottom of the truck bed. The truck bed rim includes a headboard, tailgate, or a box side. The shelf may further include a headache rack pivotably coupled to the platform at the first hinge.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Except where expressly indicated, all numerical quantities in this description indicating dimensions or material properties are to be understood as modified by the word "about" in describing the broadest scope of the present disclosure.

The first definition of an acronym or other abbreviation applies to all subsequent uses herein of the same abbreviation and applies mutatis mutandis to normal grammatical variations of the initially defined abbreviation. The figures are schematic and the depicted dimensions are for illustrative purposes only.

Trucks, pick-up trucks, lorries have been designed to carry and transport cargo. For this purpose, a truck has an open cargo area also called an open-box bed or a truck bed. A truck bed is an open space defined by three stationary sides forming the sides of the truck bed body, and a hinged door spaced apart from the passenger cabin of the vehicle. The truck bed may include a truck bed liner. While the truck bed offers a storage space, it is often desirable to expand the storage area to provide an additional place to set and/or store tools, goods, and/or equipment. It would be also desirable to provide a storage space which would not interfere with the storage area of the truck bed itself. Yet, the additional storage system should not add excessive weight or hinder normal usage of the truck bed and should not obstruct the view from the passenger cabin.

Figure 1:
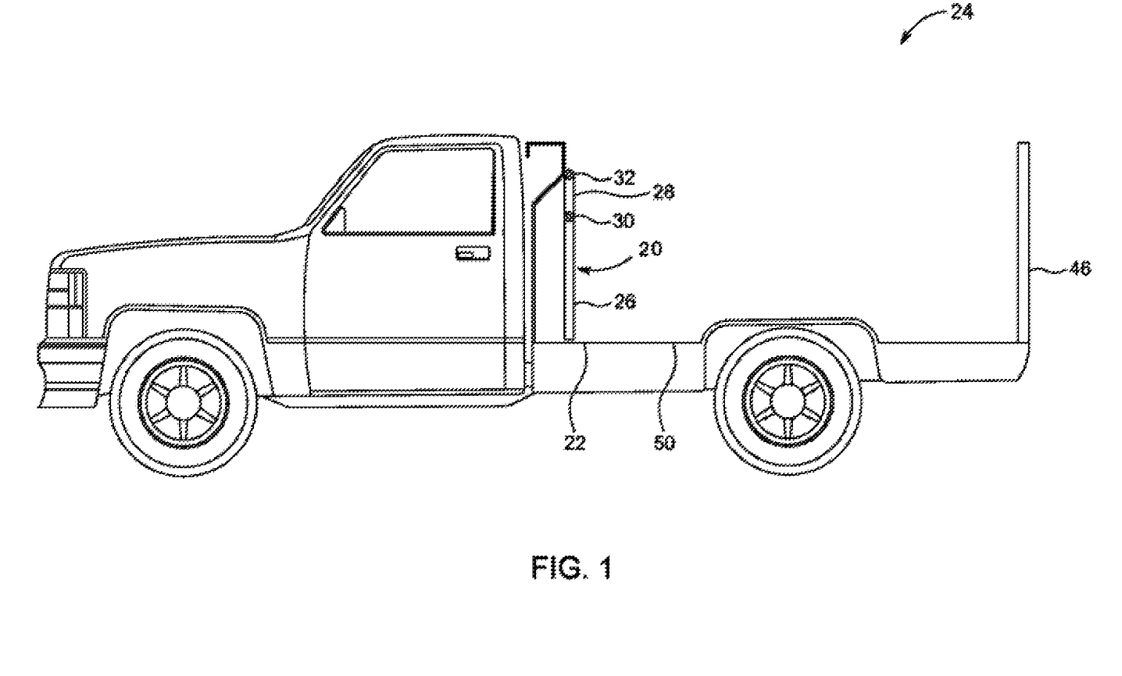
FIG. 1 depicts a schematic side view of a vehicle with an example shelf system in a stowed position according to one or more embodiments in the truck bed of the vehicle, the side truck bed panel is not depicted for illustration purposes.

In one or more embodiments, such as the one depicted in FIG. 1, a truck bed storage shelf 20 is disclosed. The shelf 20 is foldable and stowable such that the shelving system 20 does not prevent usage of the truck bed area. The shelf system 20 described herein is not limited to a truck bed 22 but is rather applicable to any open storage bed or space of a vehicle 24 such as a truck, pick-up truck, lorry, sports utility vehicle (SUV), trailer car, or the like. The shelf system 20 may have any dimensions and be adjusted according to the needs of a specific application.

The shelf system 20 may be lightweight, yet durable, and strong enough to carry a variety of objects. The shelf 20 may have features (not depicted) enabling securing objects to the shelf and/or the truck bed itself. A variety of objects may be stored and/or secured onto the shelf 20 such as non-motorized vehicles like a bicycle, tricycle, luggage, containers, canisters, boxes, crates, pellets, tools, sports accessories, recreational accessories, or the like.

The shelf 20 may be made from metal such as iron, steel, aluminum, alloys, composite materials, plastic, wood, or the like. Different portions of the shelf 20 may be made from different materials. For example, one or more portions may include a skeletal structure with a lightweight fabric or foil secured to the structure. The fabric or foil may be waterproof, assist with regulation of temperature of the truck bed area, or the like.

Providing a hollow construction of at least one portion of the shelf system 20 may assist with providing a lightweight shelf system 20. Alternatively or in addition, the material the shelf 20 is made from may be perforated. The perforations may house features for attachment and may add additional versatility to the shelf system 20. The perforations may be temporarily sealable with plugs made from plastic or other material. If the construction of the shelf 20 is hollow, such as made from tube-shaped parts, the inner side of the parts may be at least partially filled with an insulation material such as foam.

Figure 2:
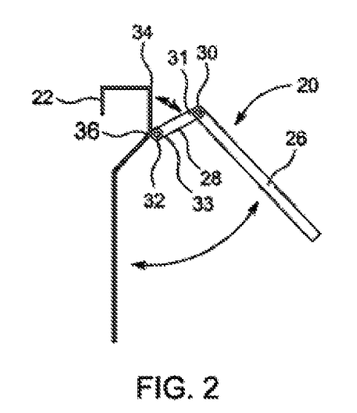
FIG. 2 depicts the shelf system of FIG. 1 being unfolded.
Figure 3:
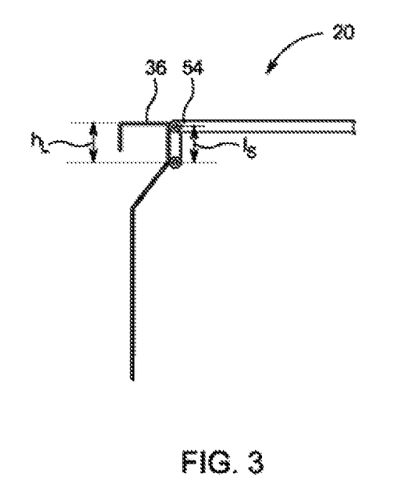
FIG. 3 depicts the shelf system of FIG. 1 in a raised position.

The shelf 20 includes a number of different parts assembled together to form the shelf system 20. As is schematically illustrated in FIGS. 1-3, the shelf 20 includes a platform 26 and a support 28 which is attached to the platform 26 via a first hinge 30 at one end 31 of the support.

The support 28 is attached to the truck bed 22 via a second hinge 32 at a second end 33 of the support.

For illustration purposes, the shelf 20 is attached at the truck bed headboard 34, specifically at a lip 36 of the headboard 34. Yet, the shelf 20 is attachable anywhere alongside the top perimeter of the truck bed 22, for example at a box side 42, 44, on the hinged door or tailgate 46, in a corner, at the floor 50. A combination of shelves 20 is contemplated, the individual shelves 20 being attached at various locations of the truck bed 22. The plurality of shelves 20 may be interconnectable at one or more locations, for example via a third hinge at a second end of the platform 26 or via additional hinges.

The shelf 20 may span the entire length and/or width of the truck bed 22. Alternatively, the shelf 20 may be shorter than the length and/or width of the truck bed 22. For example, if the shelf 20 is attached at the box side 42, the shelf does not extend to the box side 44 when fully extended. Similarly, when the shelf 20 is attached at the headboard 34, the shelf 20 does not reach the tailgate 46 when fully extended.

Figure 4A:
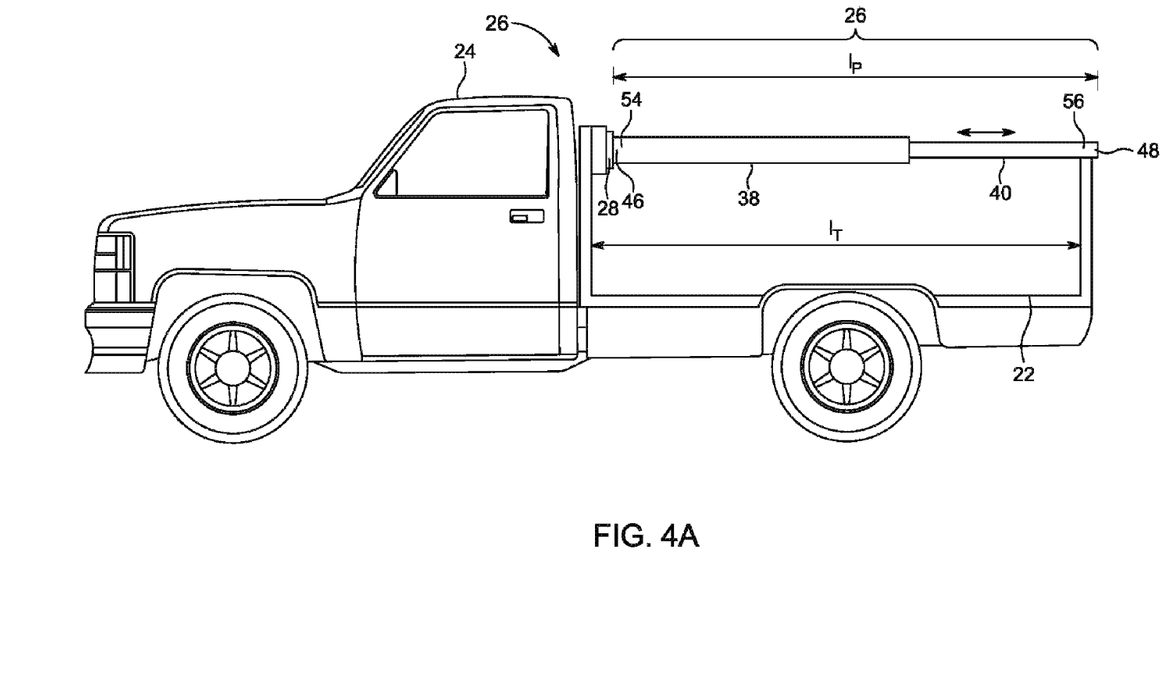
FIG. 4A shows a schematic side view of the shelf system of FIG. 1 with an extendable platform, the side truck bed panel is not depicted for illustration purposes.
Figure 4B:
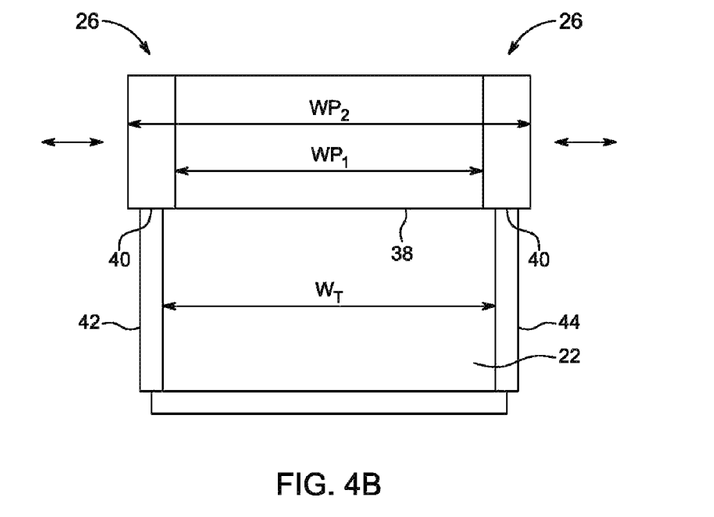
FIG. 4B shows a schematic top view of a truck bed of a vehicle with the extendable platform of the shelf system.
Figure 4C:
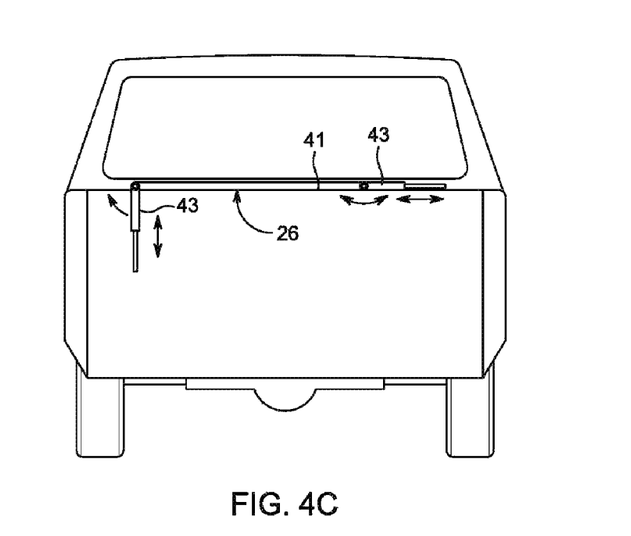
FIG. 4C shows a schematic rear view of a vehicle with the shelf system with extendable platform portions.

The platform 26 is an elongated piece. The platform 26 may be a solid piece or include one or more perforations. The platform 26 may have a constant or variable thickness. At least one of the platform's dimensions may be adjustable. For example, as can be seen in FIGS. 4A-4C, the platform 26 may be expandable in at least one direction. The platform 26 may include an outer stationary portion 40 and at least one inner telescoping portion 38 which may be removable and/or extendable from within the outer stationary portion 40. The inner portion 38 may have different dimensions and material than the outer portion 40. For example, the outer portion 40 may be a solid sleeve and the inner portion 38 may be a perforated net. Alternatively, the inner portion 38 may be a solid plate. FIG. 4A depicts a single telescoping portion 38, which is extendable to a length $l_P$ of the platform 26 equal to the length $l_T$ of the truck bed 22. The length of the platform may extend beyond the length of the truck bed 22.

In FIG. 4B, two extendable inner portions 38 are depicted, one on each side of the platform 26. The extendable inner portions 38 increase the length of the platform 26. For example, while the outer portion 40 of the platform 26 may have a maximum width $w_{P1}$ equal to the width $w_T$ of the truck bed, the one or more inner portions 38 enable extension of the width of the platform 26 at least to the width of the truck body from one outer edge of the truck side body to the opposing edge of the truck side body.

In FIG. 4C, an alternatively mechanism of an extendable platform 26 is depicted. The platform 26 has a main portion 41 and two lateral portions 43, which are pivotable to be flush with the main portion of the platform 26 in the raised position. The lateral portions 43 may be attached via hinges. The lateral portions 43 may include an outer sleeve and a telescoping inner portion, equivalent to the structure described in FIGS. 4A and 4B.

The platform 26 may have a first end 54 and a second 56. The first end 54 is located at the first hinge 30, connecting the platform 26 to the support 28. The second end 56 is located at the opposite side. The second end 56 is in close proximity to the truck floor bed 50 in the stowed position and in close proximity or in contact with the top of the truck tailgate 46 in the raised position. The second end 56 of the platform 26 may include various features such as attachment features like hooks, brackets, hinges, non-slip attachments, or a combination thereof.

The platform 26 is attached to the support 28 via the first hinge 30. The support 28 has a length $l_S$ which may equal a height of the truck rim lip $h_L$. In one or more embodiments, the length $l_S$ may be smaller or greater than $h_L$ such that the platform 26, in its raised position is not flush with the lip 36. The rim 52 refers to an upper edge of the truck bed body which may have a portion extending towards the center of the truck bed referred to as the truck bed rim lip or just the lip 36. The lip 36 may be present anywhere along the perimeter of the truck bed 22 such as at the headboard, the one more sides 42, 44, or the tailgate 46. The platform 26 has a greater length than $l_S$. In at least one embodiment, $l_S$ may equal the length of the outer portion 40 of the platform. The platform 26 may be a single piece with a skeletal structure having a fabric/foil/sheet material extending between at least some or all sides of the structure. The fabric may be a net made from metal, polymer, fiber, composite, or a combination thereof.

The support 28 may be a solid piece or a piece containing one or more perforations. The thickness of the support 28 may be uniform or variable. The thickness of the support 28 may equal the thickness of the platform 26, the outer portion 40, or the inner portion 38.

The first and second hinges 30, 32 are spaced apart from each other at opposing ends of the support 28. The shelf 20 is thus configured to have a plurality of positions. For example, the shelf 20 may freely hang under the truck bed rim 52 or lip 36 in a stowed position. Alternatively, the shelf 20 may lie in a horizontal orientation in a raised position. When the shelf 20 is in the raised position, the shelf 20 may lie flush with a top edge of the rim 52 or lip 36. In the stowed position, the shelf 20 may be in a vertical orientation. In the stowed position, the shelf 20 may hang in such a way that a least a portion of the shelf 20 is under the truck rim 52 or is flush with a side edge of the truck rim 52. In at least one embodiment, the entire shelf 20 may hang in the space under the truck rim 52 in the stowed position.

The shelf 20 may be securable in additional positions between the stowed position and the raised position. For example, the platform 26 may include one or more securing features for the purpose of securing the shelf 20 to the truck bed liner, truck bed sides, tailgate, corners, rim, lip, or a combination thereof. The securing features may include hooks, claps, pegs, links, locks, pins, or other fastening features.

The first hinge 30 may be temporarily or permanently attachable to the rim 52 or the lip 36. Since it is desirable to stow the shelf 20 away when not in use, the first hinge 30 should be capable of holding the platform 26 in the raised position without having to be permanently attached to the truck bed 22. Thus, the shelf 20 allows for a quick set-up from the stowed position to the raised position and a quick disassembly from the raised position to the stowed position.

Figure 6:
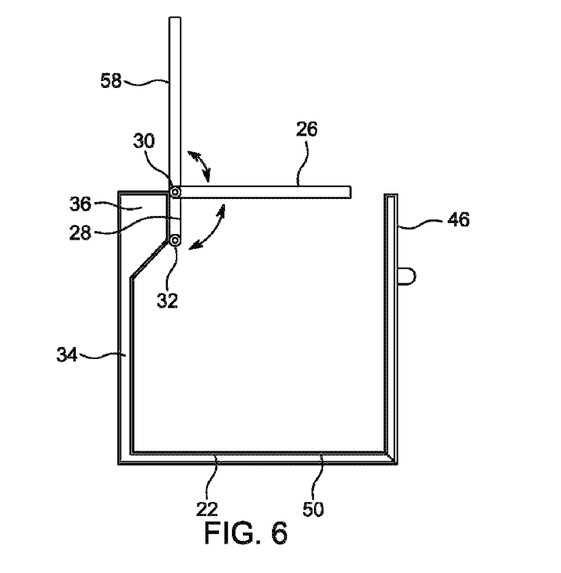
FIG. 6 shows a schematic side view of the truck bed with the shelf system including the headache rack in the raised position, the side truck bed panel is not depicted for illustration purposes.

In another embodiment, depicted in FIG. 6, an additional portion is added to the shelf 20 described above. The additional portion may be a headache rack 58. The rack 58 is a portion extending the width of the truck bed 22 from side body 42 to the side body 44. Alternatively, the rack 58 may extend the length and/or height of the back vehicle window 60. The rack 58 serves as a barrier, preventing fracture of the back vehicle window 60 by an object approaching the window 60 from the rear. The rack 58 may have an irregular shape. The shape may follow contours of the back vehicle window 60. The rack 58 may be a solid piece or include at least one perforated portion. In any case, the rack 58 may be transparent to allow a driver of the vehicle full unobstructed view from the back vehicle window 60. For example, the rack 58 may include a frame with a mesh inbetween the frame sides. Alternatively, the rack 58 may include a plurality of bars forming a skeletal structure, extending from the top portion to the bottom portion of the rack 58. The rack 58 may have individual portions such as bars, strings, wires, strands, threads distributed with such spacing that the rack 58 is capable of preventing an object approaching the vehicle from the rear, or an object stored on top of the shelf 20, from penetrating the back vehicle window 60 and injuring the driver and/or other passengers. The shelf 20 may include metal, composite, plastic, wood, or a combination thereof. The mesh may be metal, fiber, or made from another flexible and/or ductile material. The rack 58 may include more than one type of mesh. The rack 58 may include a wire screen or wire mesh. The rack 58 may include one or more portions with a higher thickness of strands than the remaining portions of the rack 58.

The rack 58 may be attached to the platform 26 and/or the support 28 via the first hinge 30 or via a separate hinge which is in close proximity to or adjacent to the first hinge 30. Alternatively, the rack 58 may be removable such that the rack 58 may be clipped on or otherwise temporarily attached to the shelf 20. The rack 58 may be folded and lie in a horizontal orientation on top of the platform 26. Alternatively, the rack 58 may stand in a vertical orientation, parallel to the back vehicle window 60. Thus, the rack 58 may be perpendicular to the platform 26 in the raised position.

Figure 7A:
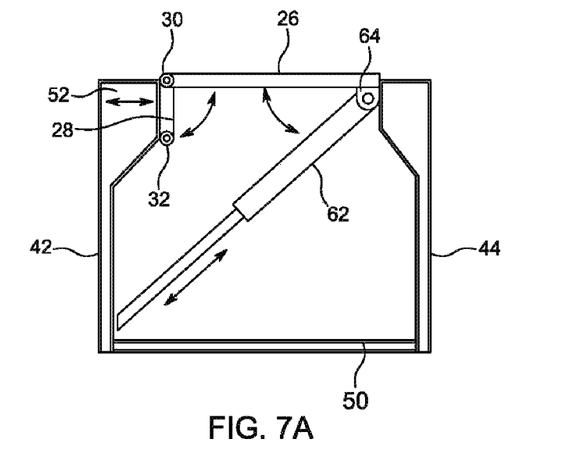
FIG. 7A shows a schematic rear view of the truck bed with the shelf system including a leg supported against a truck bed side.
Figure 7B:
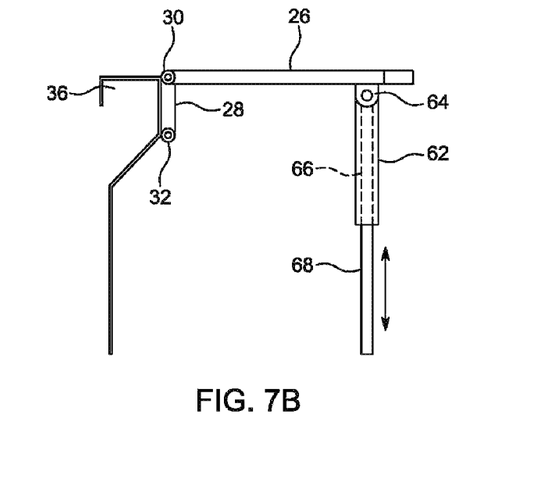
FIG. 7B shows a schematic side view of the shelf system attached to a truck bed rim.

In a yet another embodiment, illustrated in FIGS. 7A-7B, the shelf 20 includes one or more legs 62 hingedly attached to the platform 26 via a third hinge 64. The third hinge is spaced apart from the first hinge 30 and the second hinge 32. The one or more legs 62 may be extendable, telescoping. The legs 62 may include an outer sleeve 66 housing an inner portion 68. The inner portion 68 may extend out of the sleeve 66. Just like the extendable inner portion 38 of the platform 26, the legs 64 may include a locking mechanism enabling locking of the inner portion 68, once extended out of the sleeve 66 or inside of the sleeve 66, in a certain position, thus enabling adjustment of the leg 62 length and securing the leg in the desirable length.

In the raised position, the one or more legs 62 may be secured against the truck bed floor 50, truck bed corner 48, truck bed side body 42, 44, and/or truck bed headboard 34. In the stowed position, the leg 62 is in a vertical orientation, the bottom of the leg 62 pointing towards and being in close proximity of the second hinge 32, the third hinge 64 being in close proximity with the truck bed floor 50.

While the one or more legs 62 may assist with support of the platform 26 in the raised position, in one or more embodiments, the platform 26 may remain parallel to the truck bed floor 50 when the legs 62 are absent or folded alongside the platform 26 by either being suspended in air or by being supported by the top end of the tailgate 46.

Figure 8A:
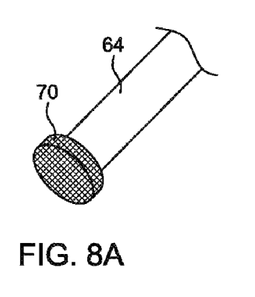
FIGS. 8A and 8B depict schematic example anti-slip features attached to legs of the shelf system.
Figure 8B:
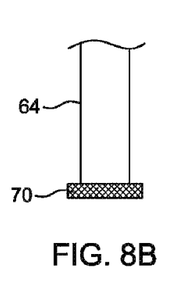

As FIGS. 8A and 8B illustrate, the legs 62 may include a portion 70 featuring an anti-slip material. The material may be textured to prevent slipping of the bottom of the leg 62 on the truck bed 22 surface. The material may be in the form of a removable boot, which may have a shape optimized for the truck bed floor 50 or a truck bed corner 48. Alternatively, at least one of the legs 62 may include a caster wheel, an attachment feature, or the like.

Figure 5:
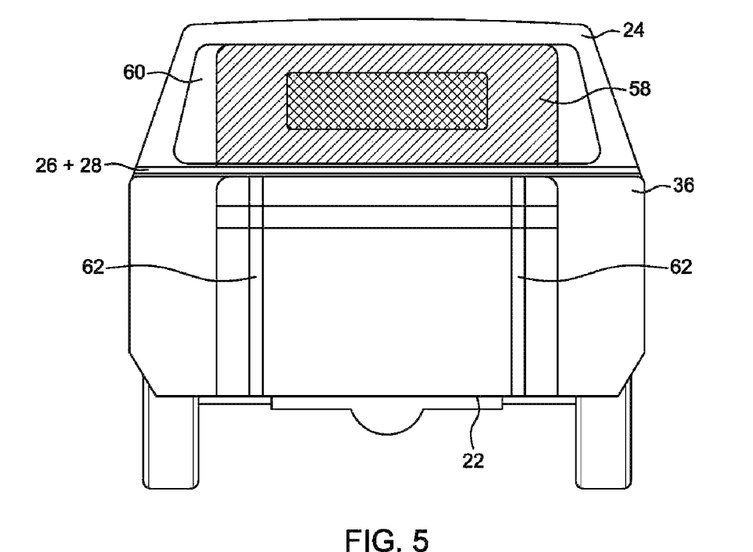
FIG. 5 shows a schematic rear view of a vehicle with an alternative embodiment of the shelf system having a headache rack in a raised position.

The shelf 20 may have any number of legs 62. For example, the shelf may have 1, 2, 3, 4, 5, 6, 7, 8, 9, 10, or more legs. An example shelf 20 with two legs 62 is depicted in FIG. 5. The legs 62 may have different dimensions. The legs 64 may be regularly distributed along the width of the truck bed 22.

Figure 9:
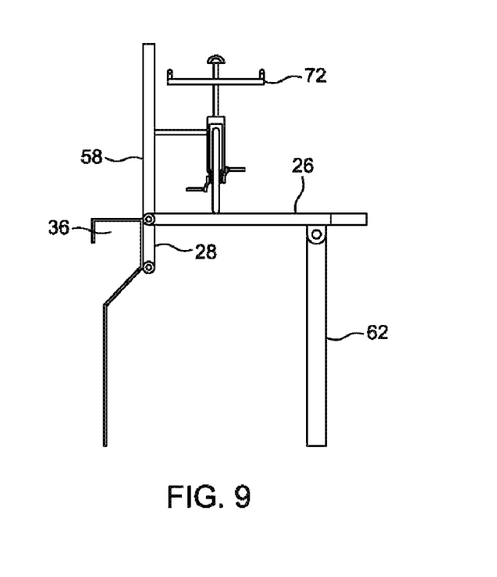
FIG. 9 shows a side view of an example shelf system including an example object being supported by the shelf.

As is depicted in FIG. 9, the shelf 20 may include the platform 26, the support 28, the rack 58, as well as the one or more legs 62 at the same time. FIG. 9 shows a supported object, a bicycle 72, for illustration purposes only.

Figure 10:
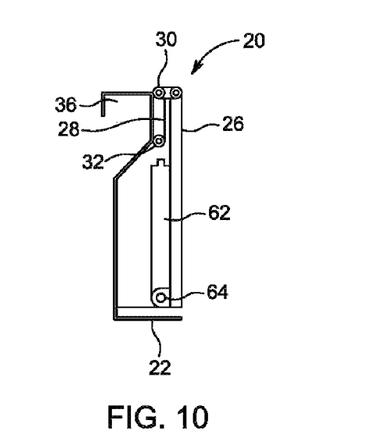
FIG. 10 shows an alternative embodiment of the shelf system in a vertical orientation.

In a yet alternative embodiment, depicted in FIG. 10, the shelf 20 may be stowable in an alternative way. In both the stowed and raised positions, the support 28 remains adjacent to the truck bed lip 36 in a parallel position to the rim 52. The platform 26 thus hangs freely from the first hinge 30 adjacent to the rim 52, as opposed to under the rim 52, as was described in the previous embodiments. This embodiment may be especially beneficial if the leg 62 has a greater thickness than the platform and support such that the leg 62 may be accommodated within the space under the lip 36.

Figure 11:
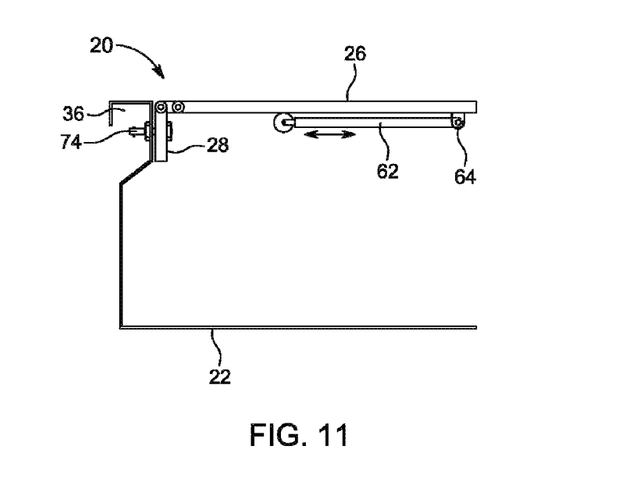
FIG. 11 shows a yet another alternative embodiment of the shelf system with the support being attached to the truck bed rim.

In a yet alternative embodiment of FIG. 11, the second hinge 32 is eliminated. Instead, the support 28 is attached to the lip 36 or rim 52. The platform 26 and/or the rack 58 are attached to the support 28 via the first hinge 30. The attachment 74 may be temporary or permanent. The attachment feature 74 may include fasteners, bolts, nuts, screws, anchors, pins, clips, rivets, rods, clamps, washers, adhesive, or a combination thereof.

The first, second, and third hinges 30, 32, and 64 may be any type of a hinges capable of providing functions described herein such as supporting the platform 26, the support 28, the rack 58, and the legs 62 in the stowed position, the raised position, or any other position inbetween. The hinges described herein may be any mechanical bearing capable of connecting two or more objects. The hinges may run a portion or the entire width of the truck bed 22, the platform 26, the support 28, the rack 58. The hinges may be spring-loaded. The hinges may be self-locking. The hinges 30, 32, 64 may each include more than one hinge, for example, represent a set of adjacent hinges. Additional hinges may be included in the shelf system 20.

Figure 12A:
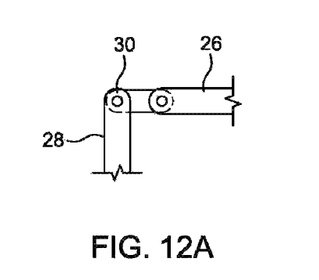
FIGS. 12A-12C show schematic views of example hinges.
Figure 12B:
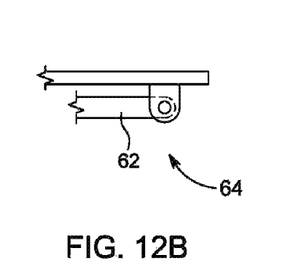
Figure 12C:
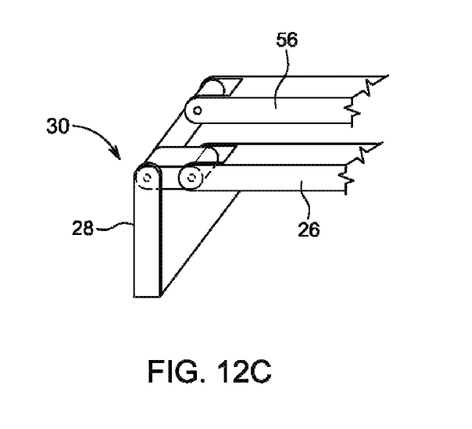

Non-limiting example hinges are depicted in FIGS. 12A-12C. Specifically, FIG. 12A depicts the first hinge 30 connecting the platform 26 to the support 28. FIG. 12B shows an example of the third hinge 64 connecting the platform 26 to a leg 62. FIG. 12C depicts a first hinge system 30 including a set of adjacent hinges connecting the platform 26 to the support 28 and the rack 58 to the platform 26 and/or the support 28.

A method of using the shelf 20 is also disclosed herein. The shelf 20 may be stowed away for storage when not in use or unfolded into a number of positions for use. The shelf 20 may be used to carry objects, to provide support for one or more objects, to lift one or more object above the truck bed 22, or the like. The shelf 20 may be used to provide additional storage space in addition to the storage space of the truck bed area 22. The shelf 20 may be used to carry and/or support objects without interfering with the truck bed area 22. The shelf 20 may assist with preventing sunlight and other weather elements from reaching and/or affecting objects within the area of the truck bed 22.

To raise the shelf 20 from its stowed position, the support 28 is rotated upwards such that the first hinge 30 comes in contact with the rim 52 or the lip 36 of the truck bed edge. The platform 26 is then unfolded from its vertical orientation to the horizontal orientation or its raised position such that the platform is parallel to the truck bed floor 50 and perpendicular to the support 28. The second end 56 of the platform may be laid on the top of the tailgate 46. Alternatively, the platform 26 may be supported by unfolding of the one or more legs 62 which can be arranged in a variety of positions. The legs 62 may be supported against the truck bed floor, corner, sides, headboard, or a combination thereof. If the platform 26 is extendable, the inner portion 38 may be pulled out from the outer portion 40 to increase the length of the platform 26. Alternatively, one or two lateral portions 43 of the platform 26 may be unfolded and/or extended. The platform's lateral portions 43 may be laid on the truck bed rim 52 for support. Alternatively still, the platform 26 may be secured in a different position than the stowed or raised position. For example, the platform 26 may be secured in a position defined by an angle between 0 and 180 degrees with respect to the side edge of the rim 52.

The platform 26 may be used as a cover of a portion or an entire area of the truck bed 22. To use the platform 26 as a cover, the platform 26 is erected into its raised position, its lateral ends are raised and extended, and the platform 26 is extended to at least the length of the truck bed 22. The platform 26 may be positioned on the top of the truck bed rim 52. In addition, the platform 26 may be secured in such position by a variety of fastening features to the truck bed body or the liner. The platform 26 may protect the contents stored beneath the platform 26 in the truck bed storage area.

To increase safety of the persons in the vehicle 24, the headache rack 58 may be unfolded from the stowed position into the raised position. Alternatively, the rack 58 may be clipped or otherwise attached onto the shelf 20. To use the rack 58, the rack 58 may be erected to be parallel to the back vehicle window 60.

To return the shelf 20 into its stowed position, the rack 58 is folded or removed. The legs 62 are folded and/or shortened to lay flat against the platform 26. The support 28 may be disattached from the rim 52 if the first hinge 30 was temporarily attached to the rim 52. The support 28 is rotated such that the first hinge 30 hangs below the second hinge 32. Thus, the platform 26 also hangs under the first hinge 30. The legs 62 are located between the hanging platform 26 and the truck bed headboard 34, side 42, 44, or tailgate 46, whichever one is closest to the legs 62. The one or more legs 62 may be secured to the platform 26 with one or more clips. Alternatively, or in addition, the platform 26 may be secured to the headboard, sides, door of the truck bed with hooks or other attachment features to prevent undesirable movement of the shelf 20 against the truck bed body or objects placed in the truck bed area.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A truck bed foldable shelf comprising:
a platform; and
a support hingedly attached to the platform with a first hinge at one end and hingedly attached to a truck bed rim at an opposing end with a second hinge, spaced apart from the first hinge, such that the shelf is configured to freely hang under the rim in a stowed position and lie in a horizontal orientation in a raised position.

2. The shelf of claim 1, wherein the shelf in the raised position lies flush with a side edge of the rim.

3. The shelf of claim 1, wherein the second hinge is attachable to a top edge of the rim.

4. The shelf of claim 1, wherein the truck bed rim includes a headboard, tailgate, or box side.

5. The shelf of claim 1, wherein the platform is extendable at both of its lateral ends to extend a width of the truck bed in the raised position.

6. The shelf of claim 1, wherein the platform has a greater length than the support.

7. The shelf of claim 1, wherein the support has a length equal to a height of the rim.

8. A truck bed foldable shelf comprising:
   a platform;
   a support hingedly attached to the platform with a first hinge at one end and hingedly attached to a truck bed headboard lip at an opposing end with a second hinge, spaced apart from the first hinge, such that the shelf is configured to freely hang under the lip in a stowed position and lie in a horizontal orientation in a raised position; and
   a headache rack pivotably coupled to the platform at the first hinge.

9. The shelf of claim 8, wherein the rack stands in a vertical orientation.

10. The shelf of claim 8, wherein the rack extends perpendicularly to the platform.

11. The shelf of claim 8, wherein the rack has dimensions exceeding at least one dimension of a truck back window.

12. The shelf of claim 8, wherein the rack comprises a solid material including a pattern of apertures.

13. The shelf of claim 8, wherein at least one dimension of the rack and the platform differ.

14. The shelf of claim 8, wherein the platform is extendable at both of its lateral ends to extend a width of the truck bed in the raised position.

15. The shelf of claim 8, wherein the shelf in the raised position lies flush with a side edge of the lip.

16. A truck bed foldable shelf comprising:
    a platform;
    a support hingedly attached to the platform with a first hinge at one end and hingedly attached to a truck bed rim at an opposing end with a second hinge, spaced apart from the first hinge, such that the shelf is configured to freely hang under the rim in a stowed position and lie in a horizontal orientation in a raised position; and
    one or more legs hingedly attached to the platform with a third hinge spaced apart from the first hinge, the one or more legs being extendable in the raised position to support the platform.

17. The shelf of claim 16, wherein the one or more legs are telescoping to enable raising a second end of the platform at various heights.

18. The shelf of claim 16, wherein the one or more legs have a rubberized ending to decrease friction between the legs and a bottom of the truck bed.

19. The shelf of claim 16, wherein the truck bed rim includes a headboard, tailgate, or box side.

20. The shelf of claim 16, further comprising a headache rack pivotably coupled to the platform at the first hinge.

\* \* \* \* \*